Patented July 6, 1954

2,683,091

UNITED STATES PATENT OFFICE 2,683,091

SOYBEAN WHIP AND METHOD OF PRODUCING THE SAME

Philip A. Singer and Harold J. Deobald, Peoria, Ill., assignors to Allied Mills, Inc., a corporation of Indiana No Drawing. Application August 15, 1950, Serial No. 179,644

8 Claims. (Cl. 99—17)

This invention relates to a tasteless proteinaceous powder produced from soy bean flakes and capable of forming a stable foam when dissolved and aerated, and the method of producing the same.

It is well known that soy bean flakes extracted with petroleum solvents or other non-alcoholic solvents are bitter and beany in flavor. In the usual processing, such as in feed processing, these bitter principles are destroyed or volatilized by a steam treatment or by direct heat treatment at or above the boiling point of water. Such treatment denatures the proteins to a degree that very little protein remains soluble in water in the treated flakes.

It has also been known that a water extract of alcohol washed hexane extracted soy flakes may be dried in a spray drier, and the resulting powder will be nearly tasteless and when dissolved in water will form a whip. Such whips, however, are not sufficiently stable and require further heat treatment. For some reason, undenatured proteinaceous extract must have a heat treatment to stabilize the foam.

Inasmuch as the water extract of alcohol washed hexane extracted flakes must be heated in the water solution before they are aerated to form a stable foam, such materials do not lend themselves to incorporation into some dry baking mixes. Obviously, they cannot be preheated in such a mix before the baking process. Even when the powder alone is to be used for making meringues and toppings for baked goods, it is inconvenient and costly in commercial bakeries to preheat a water solution of the powder because such preheating is foreign to the regular procedure of such a bakery, and the necessary equipment is not ordinarily at hand.

It has been found that a tasteless, light cream colored powder can be produced from soy beans which powder forms a stable whip when dissolved in water and when aerated and which requires no preheating in order to form the stable whip. The stable, whipped product may be used in meringues and toppings for baked goods. The product is perfectly bland to the taste.

According to this invention, the powder may be produced from soy bean flakes which have been extracted, according to the usual practices, either with alcohol or with a petroleum solvent.

If the oil is extracted with a petroleum solvent, the extracted flakes are washed in an alcohol, such as ethanol, in order to remove the bitter ingredients heretofore mentioned. For example, 500 lbs. of hexane extracted soy bean flakes may be washed with 1000 lbs. of ethanol alcohol in a continuous extractor at room temperature. The hexane extracted flakes should be processed at low temperature and the desolventizing, that is the removal of the hexane, is accomplished at temperature not over 170° F. by means of vapor desolventizing. The removal of the hexane may be accomplished by use of a system whereby the hexane-wet flakes are subjected to a continuous stream of superheated hexane vapors in a closed system. After alcohol washing, the flakes should be desolventized by superheated alcohol vapors in a similar manner as with the hexane extraction. The last traces of alcohol may be removed by a current of air. Other desolventizers, such as vacuum, warm air drying, and the like may be used provided the flakes are rapidly desolventized at low temperature so that the proteins are not excessively heat denatured.

If alcohol, rather than a petroleum solvent, is used in the extracting process, the alcohol should be kept at or below its boiling point and the same procedures of desolventizing may be employed. Obviously, it is not necessary to wash alcohol extracted flakes with an alcohol after the completion of the extraction operation. Inasmuch as alcohol has the ability of removing the bitter elements from the flakes, washing with alcohol is unnecessary where the oil extraction has been accomplished with an alcohol solvent. As previously stated, when extraction is with a petroleum solvent such as hexane, alcohol washing is necessary. Regardless of the method used for extracting the soy bean oil, the bitter elements in the extracted flakes may be washed out by an alcohol treatment. The treatment is inherent in the original extraction process, if alcohol be used as the solvent, or may be applied by a subsequent alcohol washing step if other solvents be used in the original extraction.

In all alcohol-desolventizing systems where a single unit is used, traces to 2% of alcohol remain on the flakes when they are discharged from the apparatus. Aeration of the flakes upon being removed from the apparatus by carrying them through an air cyclone system operating at room temperature will effectively remove the alcohol from those flakes having only traces of alcohol content. Air heated to temperatures in proportion to the alcohol content in flakes is required to remove alcohol when higher concentrations are present. The exact air temperature required may be easily determined by direct calculation, based on the amount of circulating air in the system and the total alcohol to be removed from the flakes. It is important that all of the alcohol be removed from the flakes at this time since a relatively low concentration of alcohol in the flake interferes with the extracting of the soy whip.

The alcohol washed or extracted flakes which are free of solvent are then extracted with water containing a very low concentration of di-valent alkaline metals. For this purpose, softened or distilled water may be used since the ions of the di-valent alkaline metals interfere with the dissolution of the water soluble proteins. The amount of water may be used in the ratio of 3 to 5 parts by weight of water to 1 part by weight of flakes. Portions of the flakes do not dissolve in the water and the undissolved portions of the flakes may be separated from the water extract by means of 80 mesh vibrating screens which serve to separate out the bulk of the insoluble material. Further clarification may be accomplished by means of a centrifuge of the basket type or of a jet-type commercial centrifuge.

The clarified water solution of the flakes is then adjusted to a concentration so that the proportion of dissolved solid material in the dispersion does not exceed 9%. We prefer to adjust the solids content of the water extract to a concentration of about 8% by the addition of softened or distilled water as may be required. This brings the extract to a specific gravity of 1.03. There is no lower limit on the solid concentration, although a solids content of less than 5% is not feasible, economically.

The solution is then heated to between 195° and 212° F. and then immediately spray dried. The heating step may be accomplished by passing the water extract, previously adjusted for proper dissolved solids concentration, through a steam jacketed heat exchanger and thence immediately to the spray drier. The time of heating should not exceed 120 minutes, and it is preferred to accomplish the heating by passing the water extract rapidly through the heat exchanger so that the heating is accomplished in less than 5 minutes.

If the concentration of dissolved solids in the water extract is 10% or greater, the mixture will form an irreversible gel on being heated to the degree indicated. By adjusting the concentration so that it is less than 10%, and preferably 9% or less, it has been found that for some reason no gelling occurs. The character of the change in the water extract due to the heating to the temperatures indicated is not well understood. Apparently there is a selective heating denaturation which changes some of the protein fractions in the dissolved material to make them more tenacious without actually interfering with the capacity of the material for aeration and for redissolving.

After the spray drying the resulting powder is creamy white in color and bland in taste. The powder may be mixed with water and readily whipped to a foam. The resulting foam is quite stable, and no heat treatment of the powder-water mixture is necessary immediately before its use in order to secure a stable foam. Thus the powder produced by the method described herein is uniform, bland in taste, and is ready for use without further treatment.

The product contains not more than about 60% protein, the balance being the water soluble carbohydrates which are found in the hexane extracted flakes. The alcohol removes only an extremely small fraction of the carbohydrates which are present in the original flake when it removes the bitter, beany-flavor producing elements. The chemical nature of the bitter, beany-flavor producing elements is not known to applicants, but by cooling the solution they may be precipitated from the alcohol as a soft, yellow-brown, clear gel. The powder contains substantially the entire water soluble fraction of the soy flakes; and the finished, spray dried material is in the form of fragile, hollow spheres which are of very small dimension, and have very thin walls.

While we have described our invention in its preferred embodiment, it is clear that modifications may suggest themselves to persons skilled in the art and the exemplary description herein given shall not be construed to limit the scope of the invention which is pointed out in the appended claims.

We claim:

1. The method for producing from an aqueous solution of the substantially unmodified protein, carbohydrate and other water soluble constituents of substantially oil-free, debittered, substantially undenatured soy bean material a powder capable of forming a stable foam when dissolved in cold water and immediately whipped at ambient temperature, which comprises: adjusting the concentration of dissolved solids in the solution to below 10%, heating the adjusted solution to a temperature between 195° and 212° F. for at least about two minutes, and spray drying the heated solution to obtain the powder in ungelled form.

2. The method of claim 1 in which the aqueous solution is heated for not more than about two hours.

3. The method of claim 1 in which the aqueous solution is heated for about 2 to 5 minutes.

4. The method of producing from undenatured, solvent extracted soy bean flakes a bland powder capable of being completely dissolved in cold water and immediately aerated at ambient temperature to form a stable foam which comprises the successive steps of washing the flakes with ethanol, removing all the ethanol from the flakes under conditions such that the protein in the flakes is not denatured by heat, water washing the flakes to obtain an aqueous solution of substantially all their water soluble constituents under conditions which avoid chemical modification of the protein, adjusting the dissolved solids of the aqueous solution to less than 10%, heating the aqueous solution to a temperature between the denaturation temperature and 212° F. for at least about two minutes, and then flash drying the solution whereby the solid material passes through gelling concentrations too rapidly to gel.

5. The method for producing from an aqueous solution of the substantially unmodified protein, carbohydrate and other water soluble constituents of substantially undenatured soy bean material a powder capable of forming a stable foam when dissolved in cold water and immediately whipped at ambient temperature, which comprises: heating the solution to a temperature between the denaturation temperature and 212° while maintaining the concentration of dissolved soy bean solids below 10%, and then flash drying the solution whereby the solid material passes through gelling concentrations too rapidly to gel.

6. The method of claim 5 in which the concentration of dissolved solids is maintained at 9% or less.

7. The method of claim 5 in which the adjusted solution is heated for about 2-5 minutes.

8. A bland, dry powder produced by the method of claim 5 having substantially all the water soluble protein and carbohydrate constituents of oil-free, substantially undenatured soy bean material and being devoid of any chemically modified proteinaceous material, said dry powder being characterized by the fact that it forms a stable foam when aerated in aqueous solution at room temperature without preliminary heating and is completely soluble in cold water.

References Cited in the file of this patent

UNITED STATES PATENTS

| Number | Name | Date |
|---|---|---|
| 2,007,962 | Buruss | July 16, 1935 |
| 2,444,241 | Beckel et al. | June 29, 1949 |
| 2,502,482 | Sair et al. | Apr. 4, 1950 |
| 2,561,333 | Beckel et al. | July 24, 1951 |

FOREIGN PATENTS

| Number | Country | Date |
|---|---|---|
| 483,430 | Great Britain | Apr. 20, 1938 |

OTHER REFERENCES

Miller, "Egg-White Substitute from Soybean Meal," Food Materials and Equipment, January 1945, pages 14-15.

Watts, Ind. and Eng. Chem., September 1937, pages 1009-1011.

Beckel et al., Gelsoy, The Soybean Digest, vol. 10, No. 1, November 1949, pages 17, 18 and 40.